Nov. 15, 1966 M. BOSMAN 3,285,414
METHOD AND APPARATUS FOR CONTROLLING PULSING
OF JIG WASHER SEPARATING LIQUID
Filed March 6, 1964 3 Sheets-Sheet 1

Inventor
Machiel Bosman
By Cushman, Darby & Cushman
Attorneys

Nov. 15, 1966  M. BOSMAN  3,285,414
METHOD AND APPARATUS FOR CONTROLLING PULSING
OF JIG WASHER SEPARATING LIQUID
Filed March 6, 1964  3 Sheets-Sheet 3

Inventor
Machiel Bosman
By Cushman, Darby & Cushman
Attorneys

United States Patent Office 3,285,414
Patented Nov. 15, 1966

3,285,414
METHOD AND APPARATUS FOR CONTROLLING PULSING OF JIG WASHER SEPARATING LIQUID
Machiel Bosman, Heerlen, Netherlands, assignor to Stamicarbon N.V., Heerlen, Netherlands
Filed Mar. 6, 1964, Ser. No. 350,049
Claims priority, application Netherlands, Mar. 6, 1963, 289,890
14 Claims. (Cl. 209—457)

The present invention relates to the separation of particles of different specific gravity in a jig washer in which the pulsation of the separator liquid are produced by varying the air pressure in a compartment communicating with a jig washer. The material to be separated, deposited on a screen plate submerged in the liquid, is exposed to the action of the pulsation and thus separated into a lower layer, mainly composed of particles of high specific gravity, and an upper layer mainly composed of particles of lower specific gravity.

The pulsations are normally produced by means of a programme controller for opening and closing the inlet and exhaust valves of the air chamber. Obviously, such an inelastic programme did not make allowance for the actual conditions in the material bed. If the programme is governed for instance by a drum switch controller driven by an electric motor, the adjustment of the jig washer can be changed by running the motor at a slower or faster rate, but as a result of this the whole programme will become proportionally longer or shorter.

The invention aims at a more flexible control of the jig washer and a more constant stroke under fluctuating loading conditions.

According to the invention, the supply and discharge of the air to and from the chamber are controlled by the level of the separatory liquid in the chamber itself.

The invention is of special importance for the separation of particles of different specific gravity into three products, in a jig washer comprising two or more successive separation compartments, the pulsations of the separatory liquid in each of the compartments being produced by varying the air pressure in a first and a second air chamber communicating with the first and the second compartment of the machine respectively. With such a process of separation the particles of the higher specific gravity are separated off in the first compartment, while a separation into an intermediate fraction and a light fraction is effected in the second compartment.

Making allowance for the differences in the nature and composition of the two material beds, each washing compartment is given a programme of its own, which, according to the invention, is realized by having the supply and discharge of air to and from each air chamber controlled by the level of the separatory liquid in that chamber.

The invention also relates to an installation for separating particles of different specific gravity by means of a jig washer, communicating with an air chamber to which compressed air can be supplied from a source via inlet valves and from which the air can be discharged via exhaust valves so as to produce cyclic pressure surges in the air chamber.

According to the invention, the supply and discharge of air to and from the air chamber is controlled by the level of the separatory liquid in the air chamber itself, for which purpose level scanners are provided at different heights in the air chamber which, by means of a circuit, are connected to the inlet and exhaust valves of the air chamber.

It should be observed, that "Glück auf" of March 14, 1959, page 349 mentions the use of tell-tale contacts built into the wall of the air chamber and connected to lamps and buzzers, for the purpose of level detection. However, no reference is made there to the use of such contacts for controlling the operation of the jig washer itself.

The invention will now be further elucidated with reference to the drawing.

In a modern type of jig washer the air chambers are arranged under the screen plate, and the required pulsations are produced by periodically admitting and exhausting compressed air to and from the said chambers via valves. The level of the washing water consequently varies with the phase of the cycle.

The cycle is maintaind by means of a programme controller such as a drum switch controller which feeds compressed air to cylinders for controlling the valves. Since the air chambers are mounted directly under the screen plate, the amount of separatory liquid to be accelerated is minimum, and the distance to be travelled by the liquid is about equal in all places. The result is that the bed on the sieve plate is lifted very rapidly and evenly, so that the separation is completed after a few pulsations. As a result, the machine can either be made to handle a relatively heavier load, or if the load is kept constant, be built to smaller dimensions. Furthermore, the amount of air needed per metric ton of material supplied is smaller than in other machines.

Although it should be expressly stated that the invention is not restricted to separations effected in a jig washer of this type, but can also be employed with other compressed-air operated jigs, it will be elucidated with reference to such a machine.

Figure 1:
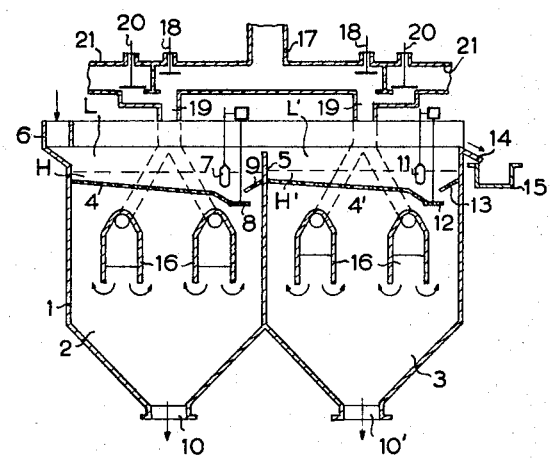
FIGURE 1 is a vertical longitudinal section of a jig washer with two separation compartments.

FIGURE 1 shows a jig washer 1 which is divided into two compartments 2 and 3 separated by a partition 5. Mounted in the upper parts of these compartments are weakly sloping sieve plates 4 and 4'.

A feed chute 6 is provided for feeding the material to be separated, e.g. raw coal, onto sieve plate 4 in the first compartment 2.

Under the action of the pulsations of the medium in compartment 2 the feed is separated into a lower layer H, containing particles of high specific gravity, e.g. shale, and an upper layer L of particles of low specific gravity, e.g. coal and middlings. The material of the higher specific gravity (such as shale) passes through an opening between the perforated discharge valve 8 and screen end 9. The discharge valve 8 is hinged at one end, and its position is controlled by a float 7 in a manner not shown in the drawing.

The inclination of screen end 9 is opposed to that of the screen plate 4 and, moreover, is steeper, so that a pocket is formed in which the heavy particles can collect. In addition, owing to this construction, the overall height is considerably smaller than that of the known device equipped with a vertically slidable discharge gate valve.

Near the bottom of the jig 1 is an outlet port 10 for removal of the shale discharged from the bed via discharge valve 8 and of the finer shale that has passed through screen 4.

The lighter coal particles and middlings are washed over the plate 5 onto screen plate 4', which partitions compartment 3. Here, these particles are separated into a lower layer H', consisting of middlings of higher specific gravity, and an upper layer L', containing the clean coal. The plate is provided with a perforated discharge valve 12 operated by a float 11, of the same design as float 7, which operates discharge valve 8. The coarse maddlings are carried off between screen end 13 and the adjustable discharge valve 12, after which they are removed through an outlet port 10' together with the finer middlings which have passed through screen 4'.

As will be clear, each of the outlet ports 10 and 10' may be connected up to a bucket elevator for the further discharge of shale and middlings.

Compartment 2 of the jig shown in FIGURE 1 acts as de-shaler to facilitate the actual separation of the coal and the middlings in compartment 3.

A discharge plate 14, fitted to the top of the jig, communicates with a discharge chute 15. The clean coal is washed over the plate 14 and carried off through the chute 15.

Under the screens 4 and 4' air chambers 16 are provided, which are open at the bottom and run the whole width of the jig 1. During operation these chambers are partly filled with liquid. A distributing pipe 17 periodically admits compressed air from a source, not shown in the drawing, to the air chambers 16 via inlet valves 18 and distributing pipes 19. In this way, the water present in the air chambers 16 is displaced downwards and flows upwards in the compartments through the screens 4 and 4'. Rapid opening of these inlet valves 18, combined with a large passage area, ensures simultaneous lifting of the particles to be separated. Furthermore exhaust valves 20 are provided, which communicate with the distributing pipes 19.

Devices for scanning the water level are mounted at different heights in one or more air chambers 16 of the jig. In the embodiment shown in FIGURE 2 these scanners consist of electrodes 22 and 23, whereas in the embodiment shown in FIGURE 3 they are constructed as float switches 122 and 123. It will be obvious, however, that many other types of scanners, e.g. dielectric switches, light sources or radioactive sources provided with detectors and similar devices, can also be used for the purpose of the invention.

Figure 2:
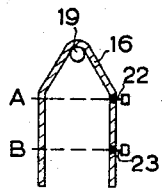
FIGURE 2 is a cross-sectional diagram of an air chamber with electrode contacts.
Figure 3:
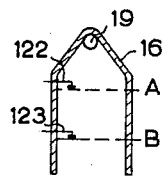
FIGURE 3 is a cross-sectional diagram of an air chamber with float contacts.

The electrodes 22 and 23 shown in FIGURE 2, and also the level switches 122 and 123 shown in FIGURE 3, are pictured in the side wall of the respective air chamber 16, but for practical reasons they will in reality be installed in one of the end walls of the chamber.

It is preferred to use electrode contacts because, in contrast to float switches, these do away with the need for moving parts in the chamber.

Contact with the liquid is brought about solely by means of a rust-proof dip rod.

Figure 4:
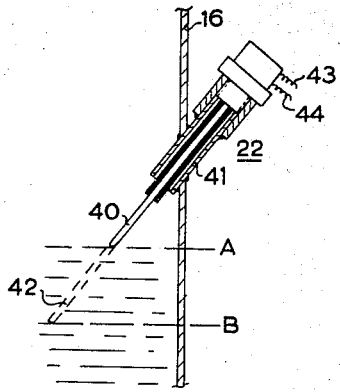
FIGURE 4 is a detailed illustration of a mounted electrode contact.

FIGURE 4 shows how such an electrode contact 22 is fitted in the vertical wall of one of the air chambers 16. The dip rod 40 is mounted concentrically in a holder 41, from which it is electrically insulated. The holder 41 is so mounted in the wall of chamber 16 as to exclude leakage of air and water and to ensure a sound electrical connection between holder 41 and the wall, which can be achieved for example, by welding.

The downward sloping dip rod 40 reaches to level A in the chamber 16. During operation this is the highest level of the washing water in the said chamber 16. The lowest level of the washing water in the chamber is indicated by B. The dip rod 42 of a second electrode contact, mounted beside electrode contact 22, reaches to this level B, as indicated by the dashed line in the figure. The dip rod and the holder are provided with electric connections 43 and 44 respectively. By preference, at least one of the electrode contacts is so constructed as to permit of vertical adjustment.

Figure 5:
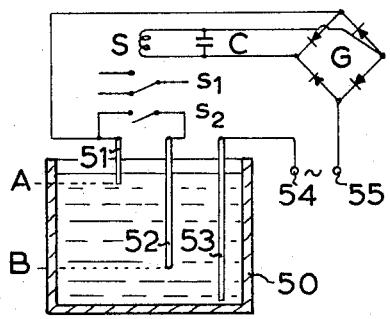
FIGURE 5 is a diagram elucidating the operation of the electrode contacts.

The dip rods 40 and 42 are capable of co-acting in a manner the principle of which will now be elucidated with reference to FIGURE 5. In a reservoir 50 three electrodes 51, 52 and 53 are suspended. Electrode 51 reaches to level A, and electrode 52 to level B. The third electrode 53 reaches down to the bottom of the reservoir, but if reservoir 50 is built of electrically conductive material, this third electrode can be omitted as in that case the said wall acts as third electrode.

Electrode 53 is connected to terminal 54 of a suitable A.C.-voltage source (e.g. 24 v., 50 Hz.), electrode 51 being connected to the other terminal 55 of the said source via a rectifier G. The D.C.-voltage side of the rectifier bridge G is connected to a relay S. This relay is provided with a switching contact $s_1$ and a "on-off" contact $s_2$. Switching contact $s_1$ is used to complete an external circuit. It will be clear that the relay S may be provided with several contacts, if necessary. Electrode 52, which reaches to the lowest level B, may be connected to the circuit of electrode 51 via "on-off" contact $s_2$. C is a smoothing condenser arranged in parallel with relay coil S.

If the liquid level in reservoir 50 rises nothing will happen when the liquid reaches electrode 52.

The moment the liquid reaches level A, the circuit to terminal 54 will be closed via terminal 55 via rectifier bridge G, electrode 51, the liquid and electrode 53. Relay S is excited; contact $s_1$ is switched, and contact $s_2$ is closed.

During a subsequent fall of the liquid level, contact $s_2$, which is now in the closed position, maintains the circuit to electrode 53 via electrode 52 via the liquid. The liquid level continues to fall until it is below B. The circuit between electrodes 52 and 53 now gets broken and the relay S drops out; contact $s_1$ is switched and contact $s_2$ is broken, and the circuit is ready for the next cycle.

Figure 6:
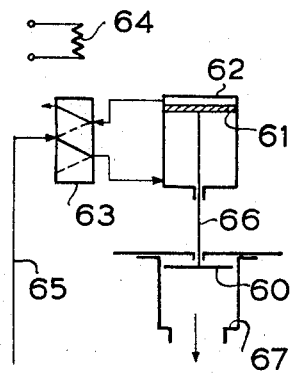
FIGURE 6 is a diagram elucidating the operation of a valve.

FIGURE 6 is a diagram showing the operation of a preferred valve. This valve has a flat seating 67 and the disc-shaped valve body 60 is mounted on the rod 66 of a piston 61 capable of travelling vertically in a cylinder 62. A valve of this type need only be slightly lifted to provide a large passage area around the circumference of the valve body. A electromagnetically controlled four-way valve 63, 64 provides for the supply of a pressure medium, e.g. compressed air from a compressed air system indicated by 65, to the space under or over the piston 61 in cylinder 62. In the situation shown, coil 64 is excited and the valve is in the open position.

The four-way valve 63 is shifted when coil 64 is de-energized, so that the compressed air is supplied over piston 61 in cylinder 62, and valve 60, 67 is closed. Instead of a four-way valve, two three-way valves with corresponding coils may be used. The piston rod 66 may be provided with an end contact (not shown) to indicate whether the valve is in the open or closed position. The mass to be accelerated for opening and closing the valve is small, made up as it is only of a flat disc valve, a piston rod, and a piston, which may be of a relatively light design, so that the valve can be opened or closed very rapidly.

Reverting to the FIGURES 1 and 2, the operation of the machine, which is controlled by the water level in the air chamber, will now be discussed. Let use suppose that the water in the air chamber is to pulse between level A and level B (FIGURE 2). The electrodes 22 and 23 respectively are then adjusted to these levels. The said electrodes are incorporated in a circuit as show in FIGURE 5. During the exhausting stage the water rises to level A, touches electrode 22, and closes the circuit.

The liquid must not enter the pipes 19 during the said exhausting stage, as this would considerably increase the resistance experience by the air during the compression stroke. Consequently, the outlet valves 20 must be closed before the liquid reaches the level of the exhaust pipes 19, which communicate with the air chambers. In the upper parts of these air chambers 16 an air cushion is formed which prevents the liquid from flowing further. The switching contact (compare contact $s_1$, FIGURE 5) is switched. This contact then admits current to the coil of an electro-magnetically controlled four-way valve (compart 64, FIGURE 6), so that compressed air is admitted behind the opposite end of the cylinder piston operating the outlet valve. When the water has risen to level A and contacts electrode 22, the exhaust valve is closed now. After the exhaust valve has closed, a circuit is completed, for instance via a contact mounted on the valve stem, as a result of which the inlet valve is opened. As a result of this, compressed air is admitted into the air chamber 16, and the water falls to level B, whereafter the relay drops out and the inlet valve is closed.

An adjustable time lag device, such as a timing relay, becomes operative then, and after the so-called expansion-time, in which the actual separation in the jig takes place, has elapsed, the exhaust valves are opened.

Owing to the difference between the liquid levels in the compartments 2 and 3 of the jig and the air chambers 16, the liquid in the said compartments flows downwards and expels the air from the air chambers 16 via the pipes 19 and the exhaust pipe 21. The water level in the chambers rises again to A, and the cycle is repeated. The number of pulsations or jig strokes per minute is now adjusted automatically by selection of the expansion time and the air pressure. Consequently, the machine keeps operating between the levels set by means of the electrode 22 and 23, even if the air pressure is changed, owing, for instance, to a modified condition of the bed.

If the supplied material is to be separated into three products by means of a compressed-air operated jig, for instance a jig of the type shown in FIGURE 1 the invention provides a simple procedure for adjusting the jig strokes in the two compartments to different amplitudes, viz. by mounting the level scanners in the corresponding air chambers at different levels. In the first bed, which contains the heavier particles, the jig stroke must be larger than that in the second bed, which contains the lighter particles. This is realized by mounting the two electrodes in the air chamber 16 under the first bed with a larger spacing A–B than the two electrodes in the air chamber under the second bed.

On account of the different setting times of the material in the first and second washing compartments, it is recommendable to chose different expansion times for the two compartments. According to the invention this can be realized in a simple way by using a separate timing relay for each compartment.

Figure 7:
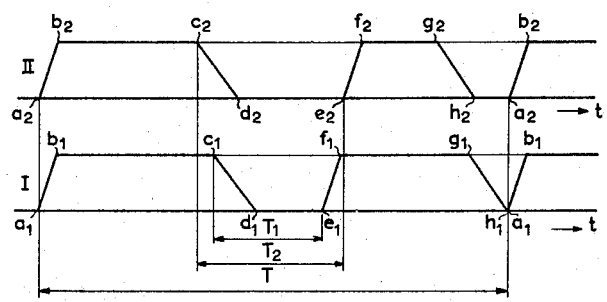
FIGURE 7 is a diagram of the supply and discharge of air into and from the jig shown in FIGURE 1.
Figure 8:
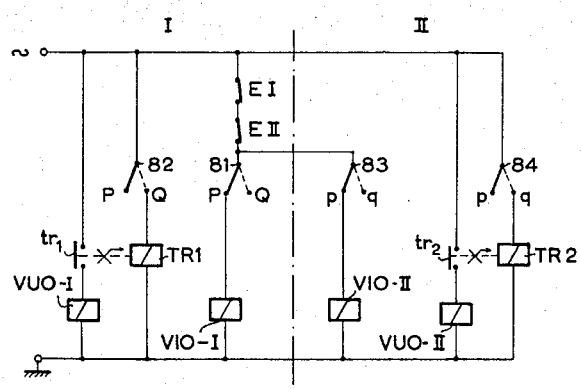
FIGURE 8 is a diagram of a possible electric circuit for controlling the inlet and outlet valves.

The operation of a jig equipped in this way will be elucidated with reference to the FIGURES 7 and 8. FIGURE 7 shows a time diagram of the opening and closing of the inlet and exhaust valves of the two jig compartments, FIGURE 8 representing a circuit which can be used for obtaining such a flexible programme.

The lower part I of the time diagram relates to the valves belonging to the first compartment while the upper part II relates to the valves belonging to the second compartment. Similarly, the left part I of FIGURE 8 shows the contacts and coils serving the first compartment, while the right part II shows the contacts and coils serving the second compartment.

Referring to FIGURE 8, the two switching contacts 81 and 82 in the left part indicate the level of the washing water in an air chamber of the first compartment, while the two switching contacts 83 and 84 in the right part indicate the level in an air chamber of the second compartment. Switching of these contacts 81, 82, 83 and 84 is done by the water level in the way elucidated with reference to FIGURE 5. Each contact can be placed in two positions, those of the contacts of the first compartment being indicated by P and Q, and those of the contacts of the second compartment by $p$ and $q$.

The coils of the electromagnetically operated four-way valves for controlling the inlet and exhaust valves of the two compartments are indicated as follows:

VUO–I is the coil for opening and closing the exhaust valve of the first compartment; VIO–I is the coil for opening and closing the inlet valve of the first compartment; VIO–II is the coil for opening and closing the inlet valve of the second compartment; VUO–II is the coil for opening and closing of the exhaust valve of the second compartment.

In the position shown in the drawing, the end contact E I indicates that the exhaust valve for the first compartment is closed. Similarly, in the position shown in the drawing, the end contact E II indicates that the exhaust valve for the second compartment is closed.

TR I is a timing relay with an adjustable time lag T I between the moments of exciting the coil and actuating contact $tr$ I. Similarly, TR 2 is a timing relay with an adjustable time lag T 2 between the moments of exciting the coil and actuating contact $tr$ 2.

Contact 82 Q is connected in series with timing relay TR I. Contact $tr$ 1 of this relay makes and breaks a circuit to coil VUO–I. Contact 81 can make and break a circuit to coil VIO–I. Contact 84 $q$ is connected in series with timing relay TR 2. Contact $tr$ 2 of this relay makes and breaks a circuit to coil VUO–II. Contact 83 can make and break a circuit to coil VIO–II. The end contacts E I and E II are connected in series with the contacts 81 and 83 in the way shown in the drawing. The circuit is fed from a power source, which, in FIGURE 8, is represented as an A.C.-source, though it will be clear that a D.C.-source can also be used for the purpose.

The operation of the jig washer in FIGURE 1, equipped with the circuit shown in FIGURE 8, will now be discussed with reference to the time diagram shown in FIGURE 7.

Suppose that the water is at the highest level in both air chambers, all valves are still in the closed position. All contacts are then placed as shown in FIGURE 8. In FIGURE 7 this situation is indicated by $a_1$ and $a_2$ respectively. Coil VIO–I is energized via E I, E II and 81 P, and the inlet valve for the first compartment opens. Coil VIO–II is also energized, via E I, E II and 83 $p$, and the inlet valve for the second compartment also opens. At $b_1$ and $b_2$ in FIGURE 7, both inlet valves are fully open. $a_1d_1$ indicates the inlet stage for the first compartment, while $a_2d_2$ indicates the inlet stage for the second compartment. The time required for opening the inlet valves is indicated by $a_1b_1$ and $a_2b_2$ respectively, which is only a fraction of the inlet stage, so that upon opening of the inlet valves, the bed is abruptly lifted.

In the air chamber of the two compartments the liquid level falls until the lower electrode contact gets clear of the liquid. As appears from FIGURE 7, this is effected first in the second compartment, with simultaneous switching of the contacts 83 and 84. The switching of contact 83 from $p$ to $q$ de-energizes coil VIO–II and thereby causes the inlet valve for the second compartment to close. This corresponds to point $c_2$ in FIGURE 7. In point $d_2$ the inlet valve is fully closed. The switching of contact 84 from $p$ to $q$, energizes the coil of timing relay TR2, and after time T2 has elapsed, causes contact $tr$2 to close. As a result, coil VUO–II is energized, so that the exhaust valve of the second compartment opens. This is indicated by $e_2$ in FIGURE 7; at $f_2$ the exhaust valve is fully open.

In the mean time the contacts 81 and 82 of the first compartment have been switched from position P to position Q. The breakage of contact 81P de-energizes coil VIO–I, as a result of which the inlet valve for the first compartment closes. This corresponds to point $c_1$ in FIGURE 7.

The switching of contact 82 to position 82Q, actuates timing relay TR1, and, after time T1 has elapsed, this relay closes contact $tr1$. As a result, coil VUO–I is energized, so that the exhaust valve of the air chamber of the first compartment is opened. In FIGURE 7 this is indicated by $e_1$; at $f_1$ the exhaust valve is fully open.

During the expansion—in which the actual washing process takes place—the particles of a high specific gravity will settle first, followed by the particles of a relatively low specific gravity. The required expansion time depends on the product to be washed, and in the process according to the invention the expansion time can be adjusted in a simple way by means of the time lags T1 and T2 of the time relays TR1 and TR2 respectively. These time lags are of the order of 1 sec., e.g. 0.5 sec.

After the exhaust valves have been opened (points $e_1$ and $e_2$ in FIGURE 7), the air is expelled from the air chamber, and the water level rises to the upper electrode.

When the exhaust valves of the two compartments are opened, the respective contacts E I and E II are broken, as a result of which the inlet valves remain closed. With E I and E II arranged as shown in the drawing, it does not matter which of the exhaust valves is opened first.

As can be concluded from FIGURE 7, the water in the air chambers of the second compartment is the first to reach the corresponding upper electrode (point $g_2$). The contacts 83 and 84 are consequently switched to position $p$, but as long as the contacts E I and E II are in the broken position, coil VIO–II of the inlet valve cannot be energized, so that the inlet valve cannot open.

When contact 84 is switched to position $p$, relay TR2 drops out immediately. The breakage of contact $tr2$ de-energizes coil VUO–II, as a result of which the exhaust valve of the second compartment closes. In FIGURE 7 the closing-time of this valve is indicated by $g_2$–$h_2$. When the exhaust valve is closed, the end contact E II closes, but as long as contact E I is broken, the coils VIO–I and VIO–II cannot be energized, and the inlet valves remain closed.

The contacts 81 and 82 in the first compartment are switched to position P at a slightly later moment, which corresponds to point $g_1$ in FIGURE 7. As a result, timing relay TR1 is de-energized, and contact $tr1$ breaks immediately. In consequence, coil VUO–I is de-energized, so that the exhaust valve for the first compartment also closes. When this valve is in the closed position in FIGURE 7, indicated by point $h_1$, the corresponding end contact E I is closed.

The coils VIO–I and VIO–II are now excited via the circuits E I, E II, 81P and E I, E II, 83p respectively, and the jig cycle can be restarted.

The above-described arrangement ensures that the jig strokes in the two compartments will be of equally long duration viz. T, and that the upward movement of the water will start simultaneously in the two compartments. The duration of the jig stroke T indicated in FIGURE 7 cannot be considered as a fixed quantity, as it depends partly on the circumstances given.

If, for example, the composition of the jig feed is such that the bulk of the material in the bed consists of shale, with the result that the bed is more resistant to the jig stroke, application of a rigid programme governed by a drum switch controller or a rotary slide would involve insufficient lifting of the bed. As the air chambers according to the invention are equipped with electrodes which communicate the water level in the chambers to the inlet and exhaust valves, satisfactory operation of the machine is ensured, even in case of feed fluctuations.

As the auxiliary contact on the exhaust valve stem is connected to the circuit for the inlet valve, with the result that the inlet valve can open only if the exhaust valve is closed, it is possible on the one hand to dispense with the compression time, and on the other hand, to prevent that air supplied through the inlet valve will immediately escape through the exhaust valve in case the latter should close sluggishly.

When the machine is being put into operation, the parts of the supply pipe leading to the air chambers 16, will normally be filled with water. As the water is at a level beyond the upper contact 22, the inlet valve is automatically kept open until the air in the upper part of the chamber has forced the water level so far down that the lower contact 23 has got clear of the water. During this period the exhaust valve remains closed. Consequently the machine starts operating as it were automatically to its proper period. The expansion times of the first and the second compartment can be controlled independently of each other by means of the timing relays.

Although this discussion is limited to the operation of a jig washer consisting of two compartments, it will be obvious to the expert that the principle underlying the invention can also be applied to machines comprising more than two compartments.

I claim:

1. In a jig washer of the type having a washing compartment containing a separating liquid and having an air chamber with an open, downwardly facing end disposed therein with the separating liquid extending into the air chamber, the air chamber being connected to a compressed air source and having inlet and exhaust valve means for alternately admitting and exhausting air from the air chamber, the air in the chamber being in free, direct contact with the separating liquid, a method for separating particles of different specific gravity comprising the steps of:
   sequentially supplying and exhausting air from the air chamber by opening and closing the inlet and exhaust valves for pulsating the separating liquid within the air chamber and washing compartment; and
   controlling the opening and closing of the inlet and exhaust valves by sensing variations in the levels of the separating liquid in the air chamber.

2. The method defined in claim 1 wherein the jig contains more than one compartment and air chamber associated therewith and comprising the steps of independently supplying and exhausting air from the air chambers of each compartment by opening and closing the inlet and exhaust valves associated therewith for pulsating the separating liquid within the air chamber and washing compartment, and controlling the opening and closing of the inlet and exhaust valves of each air chamber by sensing the variations in the levels of the separating liquid in each chamber.

3. The method defined in claim 2 comprising the steps of varying the stroke of the pulsations imparted to the separating liquid between each compartment while maintaining the same cycle period for pulsations in each compartment, and initiating each cycle by supplying air to each air chamber at the same time.

4. The method defined in claim 2 comprising the steps of varying the stroke of the pulsations imparted to the separating liquids in successive compartments, the lighter particles of the mass to be separated passing from a first compartment to a second compartment, wherein the stroke of the pulsations in the second compartment is smaller than that of the pulsations produced in the first compartment.

5. The method defined in claim 2 comprising the steps of supplying air to each compartment, and discharging air from each compartment at different time intervals.

6. The method defined in claim 5 wherein the air is cyclically supplied to each chamber at the same time.

7. A jig washer comprising:
   at least one washing compartment adapted to contain a separating liquid;
   an air chamber with an open, downwardly facing end disposed therein with the separating liquid extending into the air chamber;

a compressed air source operatively connected to the air chamber;

inlet valve means disposed between the compressed air source and the air chamber for admitting air into the air chamber, the air chamber being so constructed that the air therein is in free, direct contact with the separating liquid;

exhaust valve means operatively connected to the air chamber for exhausting air therefrom; and means for controlling the opening and closing of the inlet and exhaust valve means by sensing variations in the levels of the separating liquid in the air chamber.

8. The jig washer defined in claim 7 wherein the valve controlling means comprises level scanners installed at different heights in the air chambers and circuit means connected from the level scanners to the inlet and exhaust valve means.

9. The jig washer defined in claim 8 wherein the level scanners comprise level switches.

10. The jig washer defined in claim 9 wherein the level scanners comprise electrode contacts.

11. The jig washer defined in claim 10 wherein the electrode contacts are vertically adjustable.

12. The jig washer defined in claim 7 comprising a second washing compartment having an air chamber connected to the compressed air source, inlet and exhaust valve means, and means for controlling the opening and closing of the inlet and exhaust valve means, similar in all material respects to the corresponding elements in the first washing compartment; and means for varying the stroke of the pulsations imparted to the separating liquid between each compartment.

13. The jig washer defined in claim 12 wherein the means for varying the stroke of the pulsations comprises level scanners mounted at different heights, the spacing of the level scanners in the air chamber in one washing compartment being different from the spacing of the level scanners in the air chamber in the other washing compartment, and circuit means for connecting the scanners to the associated inlet and exhaust valve means for that air chamber whereby the supply and discharge of air to and from each of the chambers is controlled by the level of the separating liquid in the respective chamber itself, the time duration of the stroke of the pulsations being determined by the time duration of the supply and exhaustion stages of the air in the air chamber.

14. The jig washer defined in claim 13 wherein the circuit means connecting each set of inlet and exhaust valve means to the level scanners in their respective air chamber comprises at least one time lag device which becomes operative after the inlet valves have closed, and, after a predetermined period of time has elapsed, permits the opening of the exhaust valves.

References Cited by the Examiner
UNITED STATES PATENTS

| | | | |
|---|---|---|---|
| 2,606,661 | 8/1952 | Lotz | 209—457 X |
| 2,609,098 | 9/1952 | Lotz | 209—457 |
| 2,846,071 | 8/1958 | Richard | 209—455 |

OTHER REFERENCES

Gluckauf, vol. 95, No. 6, March 1959, pages 348–351.

FRANK W. LUTTER, *Primary Examiner.*